April 12, 1938.  J. F. TRITLE ET AL  2,114,196

ELECTRIC CONTROLLER

Filed Aug. 17, 1937

Inventors:
John F. Tritle,
Jacob W. McNairy,
by Harry E. Dunham
Their Attorney.

UNITED STATES PATENT OFFICE 2,114,196

ELECTRIC CONTROLLER

John F. Tritle and Jacob W. McNairy, Erie, Pa., assignors to General Electric Company, a corporation of New York Application August 17, 1937, Serial No. 159,509

12 Claims. (Cl. 172—179)

This invention relates to electric control apparatus for governing the operation of dynamo electric machines, particularly electric motors, and has for its object simple and reliable means for operating a control device through its various positions at a rate not greater than a predetermined rate.

Our invention is especially useful in the operation of controllers for electric passenger vehicles, such as electric trolley buses, wherein the driving motors are controlled by a pedal or other manually operated device.

In accordance with our invention we provide a spring operating connection between the pedal and the control device whereby the pedal may be moved immediately to an extreme full speed running position together with means, providing step by step advance of the control device in accordance with the current in the motor.

In one form of our invention we provide a ratchet mechanism comprising a ratchet wheel on the control device and a pawl biasing normally to engage the ratchet and prevent rotation thereof by the pedal. The pawl is pivotally mounted on the end of an arm which arm may be moved by electromagnetic operating means to release the pawl. Upon the application of a driving force to the control device the control device is given a very small limited angular movement, the pawl is moved thereby about its pivot on the arm to operate circuit control means which energize the electromagnetic operating means to withdraw the pawl. At the same time the electromagnetic operating means operates circuit control means to disable itself whereby the pawl is moved again into engagement with the ratchet wheel which has advanced one tooth. The circuit of the electromagnetic operating means is further controlled in response to the current in the motor to prevent advance of the controller when the current is greater than a predetermined value.

Figure 1:
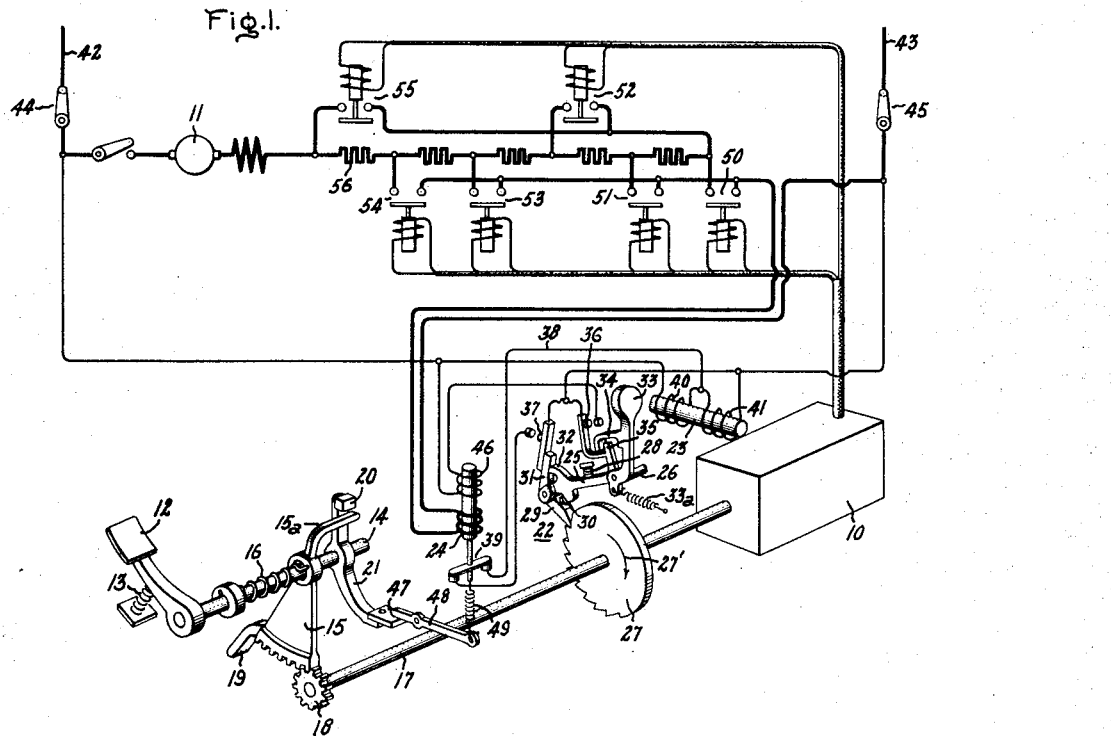
Figure 2:
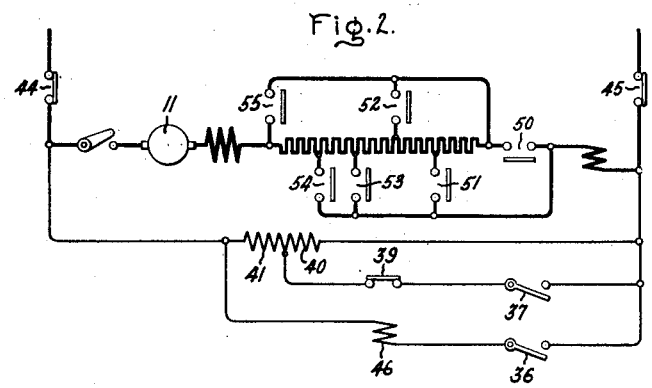

For a more complete understanding of our invention reference should be had to the accompanying drawing Fig. 1 of which is a simplified view in perspective of an electric controller embodying our invention as applied to a pedal operated controller for a trolley bus, while Fig. 2 is a simplified view of the electric motor and control circuits.

Referring to the drawing, we have shown our invention in one form as applied to the step by step operation of a drum controller 10 for the series driving motor 11 of a trolley bus. The controller 10 is shown in the off or open circuit position. It is manually operable to start and accelerate the motor 11 by means of a pedal 12 which is biased by a compression spring 13 to the off position of the controller 10 shown in the drawing. This pedal 12 is mounted on a shaft 14 on which is loosely mounted a gear sector 15. The gear sector 15 is connected to the pedal by means of a helical torsion spring 16 encircling the shaft so that when the pedal is depressed the spring is tensioned and a force thereby applied to the gear sector tending to rotate it in a counterclockwise direction, as seen in the drawing, and thereby turn the driving shaft 17 to which the gear sector is connected by a spur gear 18. A stop 19 is provided on the gear sector for engagement with the spur gear to limit the movement of the shaft 17 to its full on operating position. A second stop 20 is engaged by the arm 21 on the shaft 14 to fix the off position of the parts as shown in the drawing.

For providing step by step progressive movement of the controller shaft 17 under the control of the motor current we have provided a ratchet latching mechanism 22 which is released to provide for advance of the controller by means of an electromagnet 23, the electromagnet being energized in response to the driving force applied by the pedal through the spring 16 to the shaft 17, and also the current in the motor by means of a suitable accelerating relay operating coil 24 in the motor circuit.

The ratchet mechanism comprises an arm 25 mounted on a pivot 26 adjacent a ratchet wheel 27 which is secured to the shaft 17, the arm 25 being biased toward the ratchet wheel by a compression spring 28. On the end of the arm is pivoted a pawl 29 which, with the electromagnet deenergized, is held in engagement with the teeth of the ratchet wheel by the spring 28. This pawl 29 has limited pivotal movement on the end of the arm 28. It is biased by a compression spring 30 in a clockwise direction, as viewed in the drawing, so that an extension 31 on its upper end is in engagement with a stop 32 on the end of the arm 25.

A loose connection is provided to give a hammer blow between the armature 33 of the magnet 23 and the arm 25. The armature, biased in a counterclockwise direction by a spring 33a, is mounted on the pivot 26 and is provided with a hookshaped projection or arm 34 which extends over the end of a tail piece extension 35 on the arm 25. When the magnet 23 is energized the armature is free to move a predetermined amount and accelerate to a high speed before engagement with the arm 25 whereby the arm is given a hammer blow and the pawl snapped away from the ratchet wheel.

In the operation of the mechanism, assuming that the pedal 12 is depressed, the spring 16 applies a force tending to rotate the controller in the direction of the arrow 27'. The spring 16 is stronger than the biasing spring 30 for the pawl 29 and therefore this force, tending to rotate the ratchet wheel 27 and actually rotating it through a very small angle much less than required for the next position, moves the pawl about its pivot on the end of the arm 25 through a small angle to thereby bring an insulated movable contact 37 carried by the pawl into engagement with its stationary contact. This closes a circuit through a conductor 38 and an accelerating relay switch 39, operated by the current coil 24 short circuiting one section 40 of the winding of the magnet 23 whereby the magnet is caused to operate and pick up its armature 23. Thus the latching mechanism provides for limited angular movement of the control device by reason of which the latch is temporarily released.

It should be noted that the magnet 23 has two windings 40 and 41, which are oppositely wound and connected in series with each other across the supply terminals 42 and 43, the switches 44 and 45 being closed. These coils are wound so that their magnetomotive forces are balanced. If the two coils are identical, they have the same number of turns. Therefore, when the two coils are energized one neutralizes the other and the electromagnet is disabled. When the coil 40 is short circuited, however, the armature is picked up by the flux from the second winding 41.

The short circuiting of the coil 40 provides an inductive time interval in the operation of the magnet in picking up its armature by virtue of the current induced in the short-circuited coil 40, the induced current exerting a magnetomotive force in opposition to that of the energized coil 41. The desired time interval may be obtained, for example, by suitably adjusting the number of turns, resistance and relation to its armature of the coil 40. This time interval gives an additional factor of safety to assure that the controller is stopped in each notch, i. e., between each pair of teeth, without skipping. In a typical device the controller remained in a notch .13 second and required .045 second to move from one notch to the next.

When the armature 33 is picked up and withdraws the pawl 29 from the ratchet wheel, the ratchet wheel advances under the force applied to it by the spring 16, but the armature 33 is released very quickly and the pawl snaps back into engagement with the next tooth of the ratchet wheel thus stopping the advance of the control device 10. This release of the armature 33 is effected by the pawl contact 37 by reason of the fact that when the pawl is withdrawn from the ratchet wheel it is immediately moved by its biasing spring 30 on the end of the arm 25 to the position shown in the drawing whereby the contact 37 is moved to disengage its cooperating contact and thereby open the short circuit for the coil 40. The coil 40 neutralizes very quickly the effect of the coil 41 and the armature 33 is thereupon released. As previously stated, the controller in a typical device was advanced from one notch to the next in .045 second and remained at each notch .13 second. This assumes that the pedal 12 has been depressed in advance of the control device and that the notching mechanism is operating automatically to advance the controller at its normal rate without any limitation imposed by the current in the motor circuit under control of the current coil 24.

Each time the control device is advanced a step in the accelerating direction a voltage coil 46 is energized on the accelerating relay switch 39, which coil operates to pick up and open the relay switch 39. This is effected by an insulated switch contact 36 carried on an arm secured to the tail piece 35 of the arm 25. When the arm 25 is operated by the armature 33 the contact 36 engages its stationary contact and thereby closes the circuit for the voltage coil 46, the coil being almost immediately deenergized by the release of the armature 33 and resultant movement of the contact 36 to its open circuit position.

Thus after being picked up by the coil 46 during each progressive movement the accelerating relay switch 39 will be held up by its current coil 24 to prevent further progression in the event that the current in the motor circuit is above a predetermined maximum value. If the motor current is below this maximum value the relay 39 immediately recloses upon the deenergization of the coil 46 for continued advance of the control device assuming that the pedal 12 is depressed to tension the spring 16.

It will be observed that this operating mechanism provides for step by step advance of the control device at any rate of speed desired by the operator, or the advance may be stopped at any point as desired simply by depressing the pedal 12 at the desired rate of operation of the control device and to the desired final position of the control device. When the pedal is depressed and the spring 16 tensioned the upper end of the arm 21 moves in a counterclockwise direction away from the cooperating extension 15a on the gear sector 15. The spring 16 then causes the gear sector to follow the arm 21. By means of a correspondingly small amount of depression of the pedal the control device is advanced one notch or step.

It will furthermore be observed that the control device can be notched back from a running position to a starting position if desired by releasing the pedal 12. In this case, however, the control device follows the movement of the pedal, the arm 25 rising against its biasing spring 28 to permit the teeth of the ratchet wheel to slip by the pawl, the ratchet wheel in this case of course turning in a counterclockwise direction as observed in the drawing.

If desired the pedal 12 may be moved to its full on position immediately, the spring 16 being tensioned correspondingly. The ratchet mechanism then operates to advance the control device 10 automatically step by step at a rate determined by its inherent time constants and the current in the motor circuit.

It will furthermore be observed that the operation of the magnet 23 to advance the control device one step is dependent upon the application of a torque to the ratchet wheel to move the pawl against its biasing spring 30.

We have also provided means for adjusting the current setting of the accelerating relay 39 in dependence upon the position of the pedal 12. This consists of an extension 47 on the arm 21 which engages one end of a lever 48 to the other end of which a helical calibrated spring 49 for the relay is secured. Thus depression of the pedal stretches the spring 49 so that the relay 39 closes on a higher current value in the coil 24. This therefore gives the operator control of the rate of acceleration and also provides for accelerating currents at the discretion of the operator in proportion to the load in the vehicle, the grade, etc.

As previously stated, the controller 10 is a conventional motor controller preferably of the drum or cam operated type. It operates to control the circuits of the operating coils of switches 50 to 55 inclusive so as to close the switches in the order mentioned. On the first point of the controller the switch 50 is closed to connect the motor 11 across the supply means with the starting resistance 56 in series with it. This resistance is cut out in sections by the subsequent closure of the switches 51 to 55 inclusive whereby the motor is accelerated to full speed.

While we have shown a particular embodiment of our invention, it will be understood, of course, that we do not wish to be limited thereto since many modifications may be made, and we therefore contemplate by the appended claims to cover any such modifications as fall within the true spirit and scope of our invention.

What we claim as new and desire to secure by Letters Patent of the United States, is:

1. The combination with a control device, operating means for said control device, means for holding said control device against movement by said operating means but providing for limited movement of said control device, means responsive to said limited movement of said control device for operating said holding means to release said control device, and means responsive to the operation of said holding means for reengaging said holding means to arrest the movement of said control device.

2. The combination with a control device, latching means biased to normally secure said control device, but providing for limited movement of said control device, means responsive to said limited movement of said control device for moving said latching means against its bias to release said control device, and means responsive to said releasing movement of said latching means for releasing said latching means to stop said control device.

3. The combination with a step by step control device, operating means for said control device, means latching said control device against movement by said operating means from one position to the next but providing for limited movement of said control device, means responsive to said limited movement of said control device for moving said latching means to release said control device for movement to the next position, and means responsive to said releasing movement of said latching means for reengaging said latching means to stop said control device in said next position.

4. The combination with a step by step control device, operating means for said control device, means latching said control device against movement by said operating means from one position to the next but providing for limited movement of said control device, electromagnetic operating means responsive to said limited movement of said control device for moving said latching means to release said control device for movement to the next position, and means responsive to said releasing movement of said latching means for reengaging said latching means to stop said control device in said next position.

5. The combination with a control device, of step by step releasing means for said control device comprising latching means for securing said control device against movement by said operating means to the next position, but providing for limited movement of said control device, a magnet having two coils, connections for energizing said coils in opposition to each other, means responsive to said limited movement of said control device for short circuiting one of said coils, an armature operated by the other of said coils to withdraw said latching means and thereby release said control device, and means responsive to said movement of said latching means for opening said short circuit whereby said latching means is released to arrest the movement of said control device.

6. The combination with a control device, of operating means therefor, a ratchet wheel on said device, an arm pivoted adjacent said ratchet wheel, a pawl pivotally mounted on the end of said arm, means biasing said arm to bring said pawl into engagement with said ratchet wheel, means biasing said pawl on said arm in a direction opposed to rotation of said ratchet wheel to an operating position, whereby said pawl is moved against its bias by movement of said ratchet wheel toward an operating position, means controlled by movement of said pawl for moving said arm to disengage said pawl from said ratchet wheel, whereupon said pawl moves in accordance with its bias to release said arm and thereby reengage said pawl with said ratchet wheel.

7. The combination with a step by step control device, of operating means therefor, a spring connecting said operating means with said control device, a latching means for securing said control device against movement by said operating means to the next position but providing for limited movement of said control device, electromagnetic operating means responsive to said limited movement of said control device for operating said latching means to release said control device for movement to the next position, and means responsive to said releasing movement of said latching means for reengaging said latching means to stop said control device in said next position.

8. The combination with a rotatable control device, of operating means therefor, a spring connecting said operating means with said device, a ratchet wheel on said device, an arm pivoted adjacent said ratchet wheel, a pawl pivotally mounted on said arm, a spring biasing said pawl in a predetermined angular position with relation to said arm, a spring biasing said arm to bring said pawl into engagement with said ratchet wheel, circuit control means operated by movement of said pawl on said arm upon movement of said operating means to tension said spring, electromagnetic operating means controlled by said circuit control means to move said arm and thereby disengage said pawl from said ratchet wheel, whereupon said pawl moves in accordance with its bias to operate said circuit control means to disable said electromagnetic operating means and thereby release said arm to reengage said pawl with said ratchet.

9. The combination with a rotatable control device, of an operating member therefor, a spring connecting said member with said device, a ratchet wheel on said device, an arm pivoted adjacent said ratchet wheel, a pawl pivotally mounted on said arm, a spring biasing said pawl in a predetermined angular position with relation to said arm, a spring biasing said arm to bring said pawl into engagement with said ratchet wheel, a pair of magnet coils connected for energization in opposition to each other, an armature for said coils connected to actuate said arm, circuit control means operated by movement of said pawl on said arm in response to movement of said manual member for short circuiting one of said magnet coils whereby said armature is actuated to move said arm and thereby disengage said pawl from said ratchet wheel, whereupon said pawl moves in accordance with its bias to open said circuit control means and thereby release said armature whereupon said pawl reengages said ratchet in accordance with its bias.

10. In the combination with a control device, of operating means therefor, latching means for said device including a latch member resiliently mounted for limited movement in response to a force applied to said control device by said operating means, a pair of magnet coils connected for energization in opposition to each other, an armature for said coils connected to withdraw said latch member to release said control device, circuit control means operated by movement of said latch member in response to a force applied to said control device for short circuiting one of said magnet coils whereupon said armature is actuated by the other of said magnet coils to withdraw said latch member, said latch member then opening said circuit control means in accordance with its bias to release said armature whereupon said latch member latches said control device in its new position.

11. The combination in a controller for an electric motor driven vehicle provided with a motor, a control device for the motor, a pedal operating member therefor, an operating spring connecting said pedal with said control device, a ratchet wheel connected to said control device, an arm pivoted adjacent said ratchet wheel, a pawl pivotally mounted on the end of said arm, a spring biasing said arm to bring said pawl into engagement with said ratchet wheel, a spring biasing said pawl on said arm in a direction opposed to rotation of said ratchet wheel when said control device is moved to accelerate the motor, said pawl biasing spring being of less strength than said operating spring whereby said pawl is moved against its bias when said pedal is operated, a magnet provided with a pair of oppositely wound operating coils connected for energization in series with each other, an armature for said magnet, a connection between said armature and said arm whereby said arm is operated to withdraw said pawl from said ratchet wheel, control means operated by movement of said pawl on said arm upon operation of said pedal for short circuiting one of said operating coils whereby said other operating coil attracts said armature to withdraw said pawl from said ratchet wheel whereupon said pawl operates said control means to open said short circuit whereby said armature is released and said pawl moved to reengage said ratchet wheel.

12. The combination in a step by step controller for an electric motor driven vehicle provided with a motor, a control device for the motor, a pedal operating member therefor, an operating spring connecting said pedal with said control device, a ratchet wheel connected to said control device, an arm pivoted adjacent said ratchet wheel, a pawl pivotally mounted on the end of said arm, a spring biasing said arm to bring said pawl into engagement with said ratchet wheel, a spring biasing said pawl on said arm in a direction opposed to rotation of said ratchet wheel when said control device is moved to accelerate the motor, said pawl biasing spring being of less strength than said operating spring whereby said pawl is moved against its bias when said pedal is depressed, a magnet provided with a pair of oppositely wound operating coils connected for energization in series with each other, an armature for said magnet, a loose connection between said armature and said arm whereby when said armature is attracted by said magnet said arm is operated to withdraw said pawl from said ratchet wheel, and thereby permit rotation of said control device by said operating spring to its next position, control means operated by movement of said pawl on said arm upon operation of said pedal for closing a short circuit around one of said operating coils whereupon said other operating coil attracts said armature to withdraw said pawl from said ratchet wheel and said pawl operates said control means to open said short circuit to thereby release said armature to permit said pawl to reengage said ratchet wheel and stop said control device in its next position, a second control means in said short circuit, a coil in circuit with the motor for operating said second control means to maintain said short circuit open when the current in the motor is above a predetermined maximum value, a calibrating spring for said second control means, and a connection between said spring and said pedal arranged to tension said spring when said pedal is moved to accelerate said motor and thereby raise said predetermined maximum current value.

JOHN F. TRITLE.
JACOB W. McNAIRY.